Aug. 9, 1927.
J. O. MESA
1,638,542
CLUTCH
Filed May 8, 1924
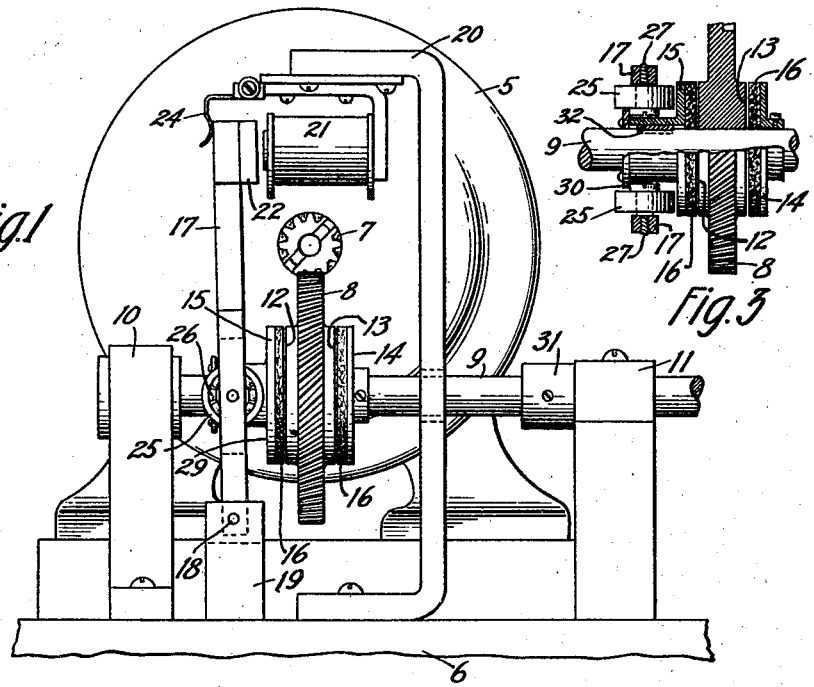
Fig.1
Fig.3
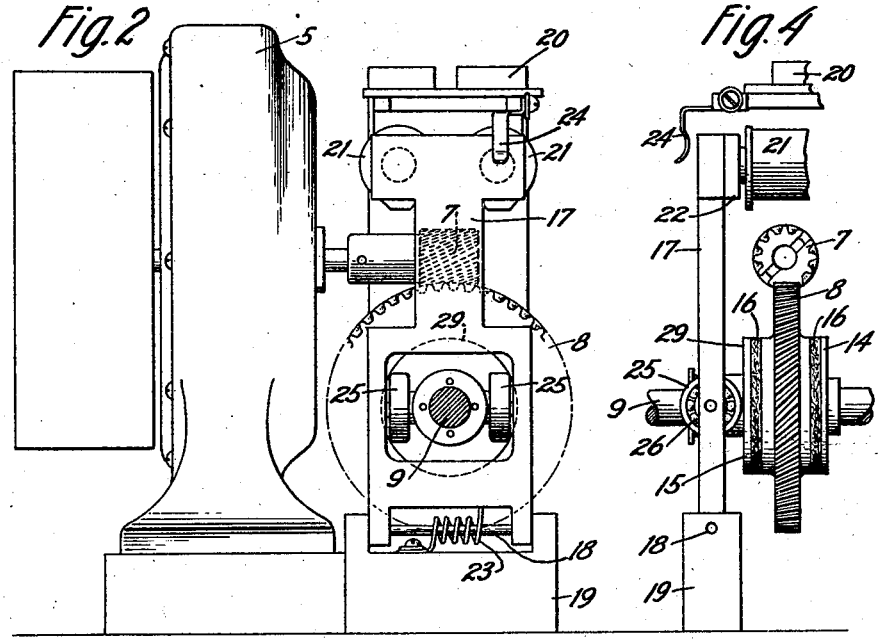
Fig.2
Fig.4
Inventor:
Joseph O. Mesa
by E.W. Adams Att'y Patented Aug. 9, 1927.

1,638,542

UNITED STATES PATENT OFFICE.

JOSEPH O. MESA, OF EAST ORANGE, NEW JERSEY, ASSIGNOR TO WESTERN ELECTRIC COMPANY, INCORPORATED, OF NEW YORK, N. Y., A CORPORATION OF NEW YORK.

CLUTCH.

Application filed May 8, 1924. Serial No. 711,752.

This invention relates to a clutch and more particularly to a magnetically operated friction clutch.

In certain types of equipment, such, for example, as printing telegraph and picture transmission equipment, it is desirable to drive rotating members at a uniform speed by means of low powered motors. Phonic wheels are often used for this purpose. In order that the rotating member may be stopped without stopping the motor, friction drives have been used in the past to couple the rotating member to the motor and a detent on the rotating member has been used to prevent rotation thereof. If the detent is much in use, the friction surfaces are subject to considerable wear which eventually results in slippage between the faces. For systems requiring exact synchronism of two rotating members during a considerable period of time, such as the synchronism required between the rotating drums in a picture transmission system, slippage in the friction drive is fatal. To prevent slippage, an undue amount of maintenance is required.

An object of the present invention is to reduce maintenance in a friction drive without simultaneously increasing the power loss therein and complicating the equipment.

Another object is to eliminate axial movement of a driven rotating member during rotation.

In one embodiment of the invention, friction surfaces carried by a driving and a driven member are forced into engagement with one another by a magnetically operated clutch arm. Ball bearing rollers mounted on the clutch arm have rolling engagement with one of the friction members. A clutch is thus provided in which there is substantially no wear on the friction surfaces and very little power used up in the clutch itself. The pressure exerted by the clutch arm furthermore prevents axial movement of the driven member during the time that it is being driven.

The novel features which are considered characteristic of this invention are set forth with particularity in the appended claims. The invention, both as to its organization and method of operation together with other objects and advantages thereof, will be further explained in the following detailed description having reference to the accompanying drawing consisting of the following figures.

Fig. 1 is a side view of the clutch and motor arrangement showing the magnetically operated clutch arm.

Fig. 2 is an end view of the same with the left hand bearing of Fig. 1 removed in order to better show the mounting of the clutch arm.

Fig. 3 is a fragmentary view of the friction members partially in cross-section showing the mounting of the ball bearing rollers.

Fig. 4 is a side view of the clutch showing the friction surfaces in engaged position.

Proceeding now to the detailed description, a phonic wheel 5 mounted on a frame 6 is provided with a pinion 7 for driving a gear wheel 8. The gear wheel 8 is rotatively mounted on a shaft 9 which is itself rotatively supported by bearing members 10 and 11. On opposite sides of gear wheel 8 are friction surfaces 12 and 13. A friction disc 14 is secured to shaft 9 on one side of gear wheel 8. Another friction disc 15 on the other side of gear wheel 8 is also mounted on shaft 9 by means of a key 32, slidable in a key way. The disc 15 is thus held in fixed angular relationship with respect to shaft 9 but allowed to move axially there-along.

On the face of each of the discs 14 and 15 are secured friction members 16, 16 of any suitable material such as cork. The friction surfaces 12 and 13 of gear wheel 8 are preferably of polished bronze. The pinion 7 and gear 8 have helical teeth.

The disc 15 with its friction member 16 is forced into engagement with the friction surface 12 of gear wheel 8 by means of clutch arm 17. This clutch arm is pivoted at 18 to a member 19 which in turn is secured to the frame 6. Mounted on a support 20 which is also secured to the frame 6 is an electromagnet 21 which is adapted when energized to attract an armature 22 secured to the upper end of clutch arm 17. The armature 22 is held in retracted position by coil spring 23, its backward travel being limited by a spring stop 24. Mounted on opposite faces within a substantially square hole in clutch arm 17 and on diametrically opposite sides of shaft 9 are rollers 25, 25. These rollers are provided with ball bearings 26 which ride on screws 27, 27. The rollers 25, 25 have rolling engagement with the surface 29 of friction disc 15.

When the armature 22 on clutch arm 17 is in retracted position, the disc 15 is moved away from gear wheel 8 by the engagement of the heads of screws 27, 27 with the collar 30. In this position there is sufficient freedom of movement of gear wheel 8 in an axial direction along shaft 9 so that the friction surfaces 12 and 13 have very slight engagement with friction members 16, 16. Thus, there is very little wear on the friction members when the shaft 9 is stationary even though gear wheel 8 is revolving. When the magnet 21 is energized and the armature 22 is in attracted position as shown in Fig. 4, the friction surfaces are forced into engagement and the shaft 9 is driven at the same rate as the gear wheel 8. Under this condition likewise, there is no wear on the friction surfaces because there is no slippage therebetween.

When the magnet 21 is energized and the clutch faces are in engagement, there is a tendency for the shaft 9 to be pushed axially toward the right. The extent of this movement is limited by the collar 31 secured to the shaft 9 coming into engagement with the bearing support 11. Thus the shaft during its rotation always occupies the same relative position with respect to the frame 6 and end play is eliminated during such time. This is not the case with the well known friction drives wherein the spring which causes the engagement of the friction members is mounted on the rotating shaft and moves therewith.

In picture transmission equipment, to which applicant's clutch is especially applicable, this elimination of end play is very valuable. The axial position of the shaft 9 determines the position of the picture drum (not shown). In such a system, with which this invention is particularly adapted for use, the axial movement of the picture drum during its rotation must be uniform or the picture will be streaked. The presence of end play would militate against such uniformity. This would be especially detrimental where the picture is reproduced in the form of parallel lines of varying width. The wear on the bearing surfaces of collar 31 and support 11 is not very great during long periods of use and is entirely negligible during the transmission of any given picture. Any wear over a period of time is automatically taken care of by the end movement of the shaft 9, when the clutch is engaged. Maintenance due to this cause is therefore practically obviated.

It is to be understood, however, that if sufficient load is placed on the shaft 9 or it is stopped in any manner, there will then be slippage which protects the apparatus from strain. This is a real advantage. This condition is exceptional, however, and normally there is no wear on the friction surfaces so that the amount of maintenance is reduced to a minimum.

This type of friction drive for the picture drums in picture transmission equipment is especially advantageous, because the drive is not only positive to all intents and purposes, but the motion of the drum is started simultaneously with the energization of magnet 21. By arranging for the simultaneous energization of the magnets 21 at both the sending and reproducing terminals, the sending and reproducing drums may be started simultaneously.

Modifications of the specific embodiment of the invention, as described, may be made without departing from the scope thereof as defined in the appended claims.

What is claimed is:

1. In combination, a clutch comprising a driving shaft, a pinion fixedly mounted on said shaft, a gear interlocking with said pinion and having friction surfaces on opposite sides, a driven shaft arranged to rotatably support said gear, a pair of discs arranged adjacent to the opposite sides of said gear, friction members secured to said discs and in engageable relation with the friction surfaces of said gear, a pair of standards for supporting said driven shaft, a collar fixedly mounted on said driven shaft adjacent to one of said standards, an electromagnetic means for sliding first, one of said discs into engagement with one of said friction surfaces of said gear and secondly, both disc and gear into engagement with the other of said discs to effect the rotation of said driven shaft, said collar being provided for the purpose of preventing the longitudinal movement of said driven shaft when said gear engages the second mentioned disc.

2. In combination, a clutch comprising a driving shaft, a pinion fixedly mounted on said shaft, a gear interlocking with said pinion and having friction surfaces on opposite sides, a driven shaft arranged to rotatably support said gear, a disc keyed to said driven shaft and slidably arranged thereon and disposed adjacent to one of said friction surfaces, a second disc fixedly mounted on said driven shaft and disposed adjacent to the other of said friction surfaces, a pair of standards for supporting said driven shaft, a collar fixedly mounted on said driven shaft and arranged in engageable relation with one of said standards, electromagnetic means comprising an armature for moving said first mentioned disc longitudinally along said shaft to engage the rotating gear and for further moving said disc to cause the interengagement of said gear and said second mentioned disc, a plurality of ball-bearing rollers attached to said armature for effecting the sliding movement of said first mentioned disc, and means associated with said rollers for disengaging said first mentioned disc and gear when said armature is retracted.

In witness whereof, I hereunto subscribe my name this 7 day of May, A. D., 1924.

JOSEPH O. MESA.